US011994081B2

(12) United States Patent
Franklin

(10) Patent No.: US 11,994,081 B2
(45) Date of Patent: May 28, 2024

(54) APPARATUS FOR ACTIVE ENGINE IDLE CONTROL

(71) Applicant: Battelle Memorial Institute, Columbus, OH (US)

(72) Inventor: Arnez Franklin, New Albany, OH (US)

(73) Assignee: Battelle Memorial Institute, Columbus, OH (US)

(*) Notice: Subject to any disclaimer, the term of this patent is extended or adjusted under 35 U.S.C. 154(b) by 0 days.

(21) Appl. No.: 18/295,864

(22) Filed: Apr. 5, 2023

(65) Prior Publication Data

US 2023/0392563 A1 Dec. 7, 2023

Related U.S. Application Data

(60) Provisional application No. 63/333,362, filed on Apr. 21, 2022.

(51) Int. Cl.

*F02D 41/08* (2006.01)
*F02D 41/02* (2006.01)
*G07C 5/08* (2006.01)

(52) U.S. Cl.

CPC ....... *F02D 41/083* (2013.01); *F02D 41/0225* (2013.01); *G07C 5/0825* (2013.01); *F02D 2200/602* (2013.01)

(58) Field of Classification Search

CPC ....... B60W 50/00; B60W 10/08; B60R 16/03; Y02T 10/62; H02J 2310/48; B60D 1/62; F02D 41/083; F02D 41/0225; F02D 2200/602

See application file for complete search history.

(56) References Cited

U.S. PATENT DOCUMENTS

2007/0241723 A1* 10/2007 Billat .................... H02J 7/1446 322/28
2013/0317685 A1* 11/2013 Kinoshita ........... B60L 15/2045 903/903
2015/0012174 A1* 1/2015 Kim ........................ B60R 16/03 701/36
2018/0354368 A1* 12/2018 Gotoh .................... B60K 6/365

* cited by examiner

*Primary Examiner* — George C Jin
*Assistant Examiner* — Teuta B Holbrook
(74) *Attorney, Agent, or Firm* — Grossman, Tucker, Perreault & Pfleger PLLC; Donald G. Weiss

(57) ABSTRACT

In an approach to active engine idle control, an apparatus comprises: an accelerator module interface; an engine control module (ECM) interface; a computer readable storage media; and a controller. The controller is configured to: determine an engine speed target for a vehicle engine in revolutions per minute (RPM) based on an electrical load on the vehicle; determine a voltage curve for one or more position sensors of an accelerator module in the vehicle; determine a voltage target for the ECM for each position sensor of the one or more position sensors; and responsive to a first signal that the apparatus is engaged and a second signal that the vehicle is stopped, set an input voltage to the ECM at the voltage target for each of the one or more position sensors.

14 Claims, 6 Drawing Sheets

APPARATUS FOR ACTIVE ENGINE IDLE CONTROL

CROSS-REFERENCE TO RELATED APPLICATIONS

The present application claims the benefit of the filing date of U.S. Provisional Application Ser. No. 63/333,362, filed Apr. 21, 2022, the entire teachings of which application is hereby incorporated herein by reference.

STATEMENT REGARDING FEDERALLY SPONSORED RESEARCH OR DEVELOPMENT

This invention was made with government support under Contract No. H92222-16-D-0043 awarded by the United States Special Operations Command of the Department of Defense. The government has certain rights in the invention.

TECHNICAL FIELD

The present application relates generally to vehicle engine controls and, more particularly, to an apparatus for active engine idle control.

BACKGROUND

The increasing demand for electronics in vehicles has been limited by the output of the on-vehicle generator (typically comprised of an alternator and a regulator). A generator outputs power proportional to the rotations per minute (RPM) induced through its windings. These rotations are directly correlated with the rotations of the engine's crankshaft. The faster the engine crankshaft rotates, the more power the generator can produce.

BRIEF DESCRIPTION OF THE DRAWINGS

Reference should be made to the following detailed description which should be read in conjunction with the following figures, wherein like numerals represent like parts.

DETAILED DESCRIPTION

Figure 1A:
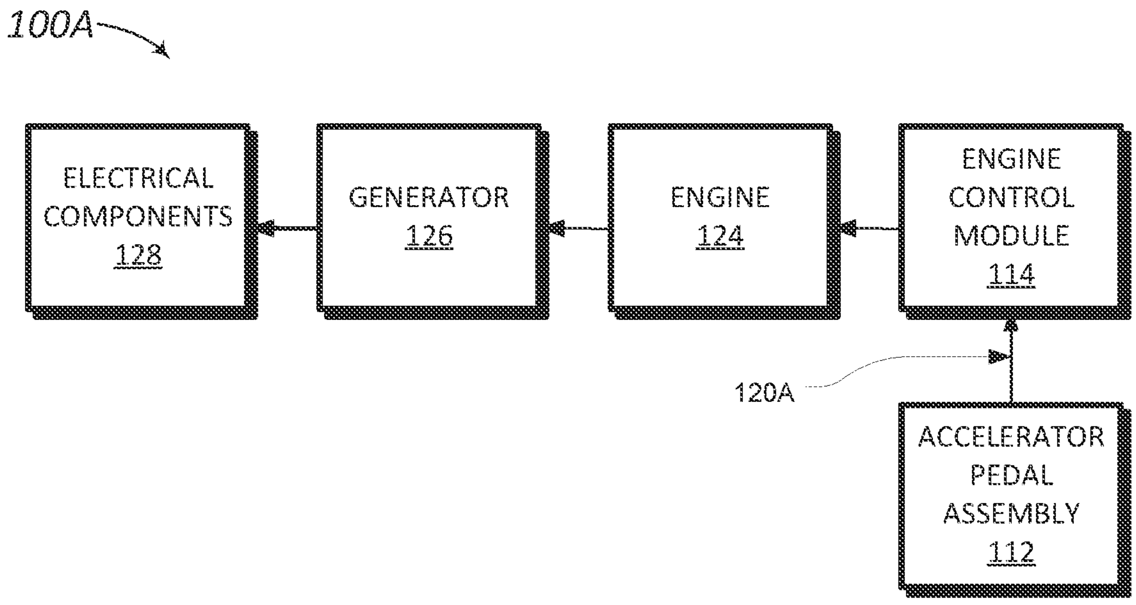
FIG. 1A is a functional block diagram illustrating an existing engine speed control circuit.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The increasing demand for electronics in vehicles has been limited by the output of the on-vehicle generator, which is typically comprised of an alternating current (AC) alternator and a voltage regulator. A generator outputs power proportional to the RPM induced through its windings. These rotations are directly correlated with the rotations of the engine's crankshaft. The faster the engine crankshaft rotates, the more power the generator can produce. Often, when a vehicle is at idle, such as when parked, stopped at a red light, or caught in traffic, the idle speed RPMs set by the manufacturer is too low for the generator to produce sufficient power for the electrical load of auxiliary or additional components added to the OE system. One extreme example of this problem occurs in military vehicles, where the high-power draw of military electronics equipment puts a severe load on the generator at idle.

In order to sustain this increasing power demand, the generator needs to idle at a higher RPM than the factory programmed idle RPM set for the vehicle by the manufacturer. Disclosed herein is an apparatus and method for active idle control that solves the problem of insufficient generator output by holding the engine RPM higher than the factory programmed idle when increased power is required. The minimum engine RPM at which the generator output meets or exceeds the electrical demand of the vehicle is herein referred to as the engine speed target.

The apparatus disclosed herein is a streamlined design with minimal tie-ins to the vehicle electrical system. In some embodiments, the apparatus requires no feedback from the crankshaft position sensor, and instead manipulates the accelerator system by electrically emulating a depression force on the accelerator pedal to tell the ECM to increase engine speed based on the "force" applied. The increased engine speed also increases the generator speed thus allowing the generator to supply more power for the additional electrical loads. The disclosed apparatus may achieve a steady target idle with no fluctuations and may include redundancy to mitigate system failure.

FIG. 1A is a functional block diagram illustrating an existing engine speed control circuit, generally designated 100A. In the example of FIG. 1A, the accelerator pedal assembly 112 connects directly to the engine control module (ECM) 114 via cable 120A. The ECM 114 is coupled to the engine 124 for controlling the output RPM of the engine 124 in response to the output of the accelerator pedal assembly 112. As is known, the rotational output of the engine 124 drives a generator 126 to generate electricity for driving electrical components 128, e.g., lights, communication equipment, radio, etc., of the vehicle.

The engine speed control circuit 100A may be part of known drive by wire configuration, where the engine speed is controlled by the ECM 114, and not directly by the accelerator pedal assembly 112. In a typical drive by wire configuration, there are one or more position sensors located in the accelerator pedal assembly. When more than one sensor is used, each sensor may read the same range or may read different ranges of voltage for redundancy. The ECM 114 adjusts the engine RPM proportionally to the voltage across the one or more sensors in the accelerator pedal assembly. As the accelerator pedal is depressed, the voltage climbs across the sensors, typically linearly, and the ECM 114 adjusts the engine RPM in response to the output of the accelerator pedal assembly 112.

Figure 1B:
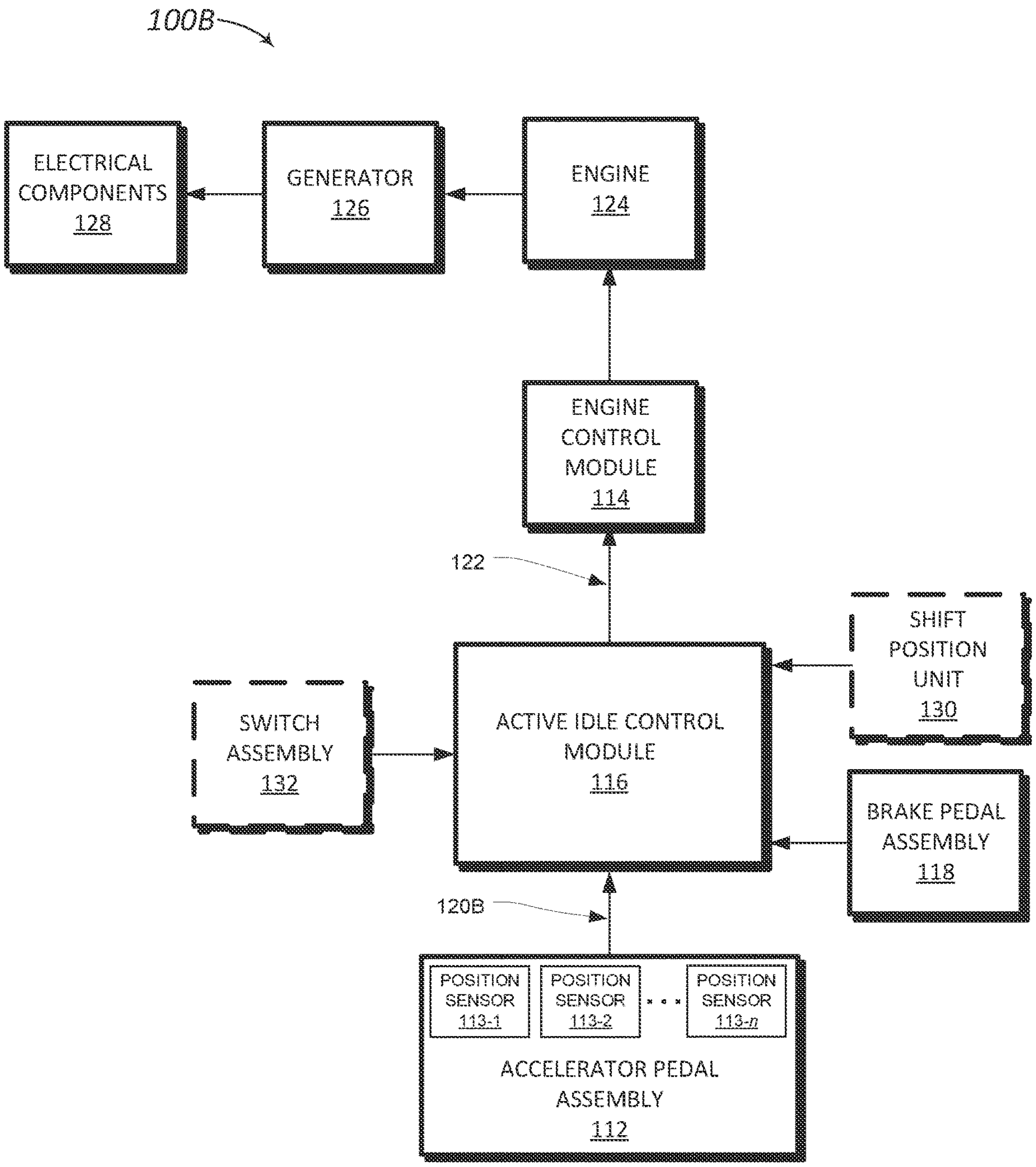
FIG. 1B is a functional block diagram of one illustrative example of an engine speed control circuit utilizing an active idle control module consistent with the present disclosure.

FIG. 1B is a functional block diagram of one illustrative example of an engine speed control circuit, generally designated 100B, utilizing an apparatus for active idle control, i.e., active idle control module 116, consistent with the present disclosure. In the example of FIG. 1B, the accelerator pedal assembly 112 is communicatively coupled to active idle control module 116, rather than the ECM 114, via pedal assembly interface 120B. The ECM 114 is also coupled to the active idle control module 116, via active engine control output 122. In order to achieve the target idle RPMs for the specific application based on the system platform (i.e., vehicle) and electrical components 128, the active idle control module 116 signals the ECM 114 to set the engine speed to a specific value.

As described above, the vehicle may have one or more position sensors in the accelerator pedal assembly for redundancy. For example, the engine speed control circuit 100B of FIG. 1B has n position sensors, i.e., position sensor 113-1, position sensor 113-2, through position sensor **113-*n***. Although the active idle control module may work with any number of position sensors in the accelerator pedal assembly, in the interest of clarity the following discussion will be restricted to a vehicle with two position sensors in the accelerator pedal assembly. In addition, for clarity the following descriptions will also assume a system with a target engine speed of 1400 RPM. The actual target RPM will vary depending on the specific vehicle type, load requirements, system setup, electrical components, etc.

In the illustrative example of FIG. 1B, the position sensor outputs of the accelerator pedal assembly 112 may be communicatively coupled to the active idle control module 116 via pedal assembly interface 120B. For example, pedal assembly interface 120B may be one or more wires, a cable assembly, or a vehicle communication bus, such as the Controller Area Network (CAN bus) or Local Interconnect Network (LIN) bus.

In response to the position sensor outputs, the active idle control module 116 may provide a signal to the ECM 114 to cause the ECM to operate the engine 124 at an RPM selected to drive the generator 126 for generating sufficient electrical energy to power the electrical components 128. In some embodiments, the engine speed control circuit 100B may also include a shift position unit 130 communicatively coupled to the active idle control module 116 and configured to indicate the shift position of the vehicle. The shift position unit 130 may provide a shift position output to the active idle control module 116 indicating the shift position, e.g., park, drive, neutral, reverse, etc. In some embodiments, the active idle control module 116 may be configured to control the RPM of the vehicle only when the vehicle is in a park shift position as indicated by the shift position output of the shift position unit.

In some embodiments, the active idle control module 116 may be configured to control the RPM of the vehicle when the vehicle is not in a park shift position as indicated by the shift position output of the shift position unit, e.g., when the vehicle is in drive. For example, in some embodiments, the active idle control module 116 may be active to control the vehicle RPM when the vehicle is in drive and the brake pedal has been depressed for a predetermined continuous period of time, referred to herein as the activation phase. In some embodiments, the timing of the duration of time that the brake pedal is depressed will reset if the brake pedal is released at any point during the activation phase and the timer will start at zero when depressed again. To determine the status of the vehicle brake pedal, the active idle control module 116 may be communicatively coupled with a brake pedal assembly 118 of the vehicle. The brake pedal assembly 118 will provide a brake pedal output to the active idle control module 116 that indicates the braking condition of the vehicle.

In some embodiments, the active idle control module 116 may draw power from the shift position unit 130 or any other component coupled thereto, or directly from the vehicle battery. In some embodiments, the accelerator pedal assembly 112 and the shift position unit 130 may be coupled to a known vehicle communication bus, e.g., a CAN bus or a LIN bus, and the active idle control module 116 may be coupled directly to the vehicle communication bus for communicating with the accelerator pedal assembly 112, the shift position unit 130, and/or the brake pedal and for providing a control output to the engine control module 114 in response thereto.

In some embodiments, the active idle control module 116 may be configured for automatic operation, e.g., in response to the outputs from the active idle control module 116, the shift position unit 130, and/or the brake pedal. In other embodiments, the engine speed control circuit 100B may include a switch assembly 132 coupled to the active idle control module 116 for activating the active idle control module 116. The switch assembly 132 may, for example, include a switch mounted in the vehicle operator compartment. In some embodiments, when the vehicle is in park the user can activate the active idle control module 116 using the switch assembly 132. When the switch is not engaged or the vehicle is not in park, the active idle control module 116 may remain in the off state.

Figure 2:
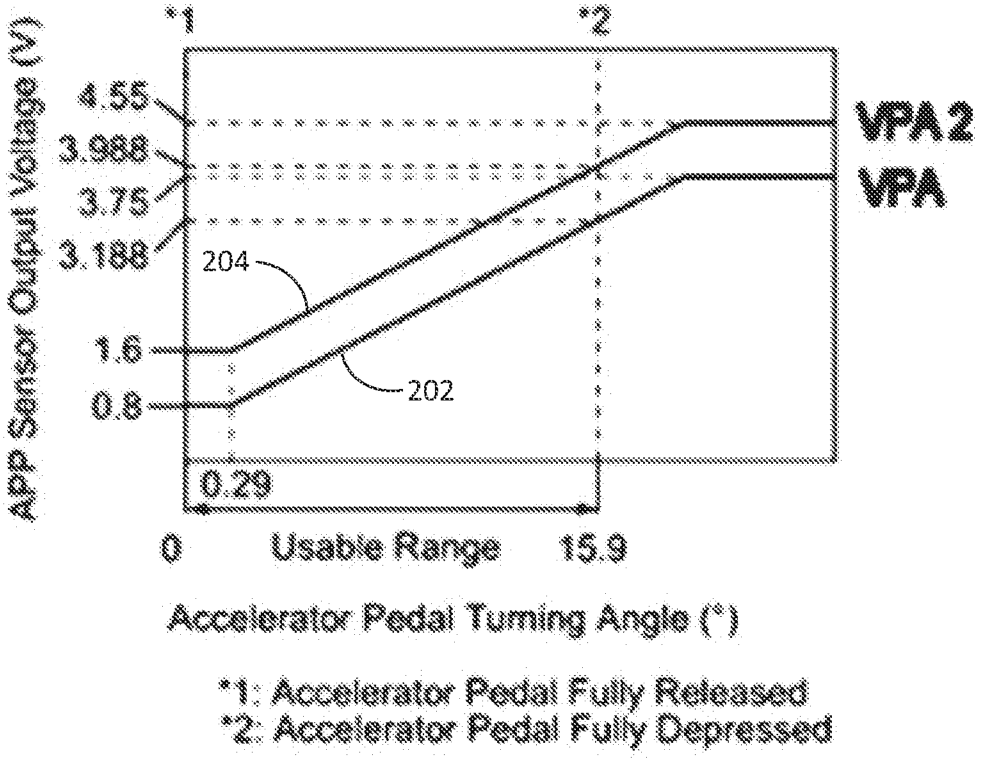
FIG. 2 is a graph displaying the output voltage of a typical accelerator pedal circuit.

FIG. 2 is a graph displaying the output voltage of one illustrative example accelerator pedal circuit. Based on the graph of FIG. 2, trace 202 illustrates that the output of sensor one, e.g., position sensor 113-1 from FIG. 1B, ranges from approximately 0.8 volts (V) with the accelerator pedal fully released to approximately 3.188V when the accelerator pedal is pushed to its maximum usable range. Similarly, trace 204 illustrates that the redundant sensor two, e.g., position sensor 113-2 from FIG. 1B, ranges from approximately 1.6V (volts) with the accelerator pedal fully released to approximately 3.988V when the accelerator pedal is pushed to its maximum usable range. Although the example of FIG. 2 illustrates two accelerator pedal position sensors, each with a corresponding voltage range, it should be noted that, as discussed above, the active idle control module 116 may contain any number of accelerator pedal position sensors that each operates over any appropriate voltage range.

Figure 3:
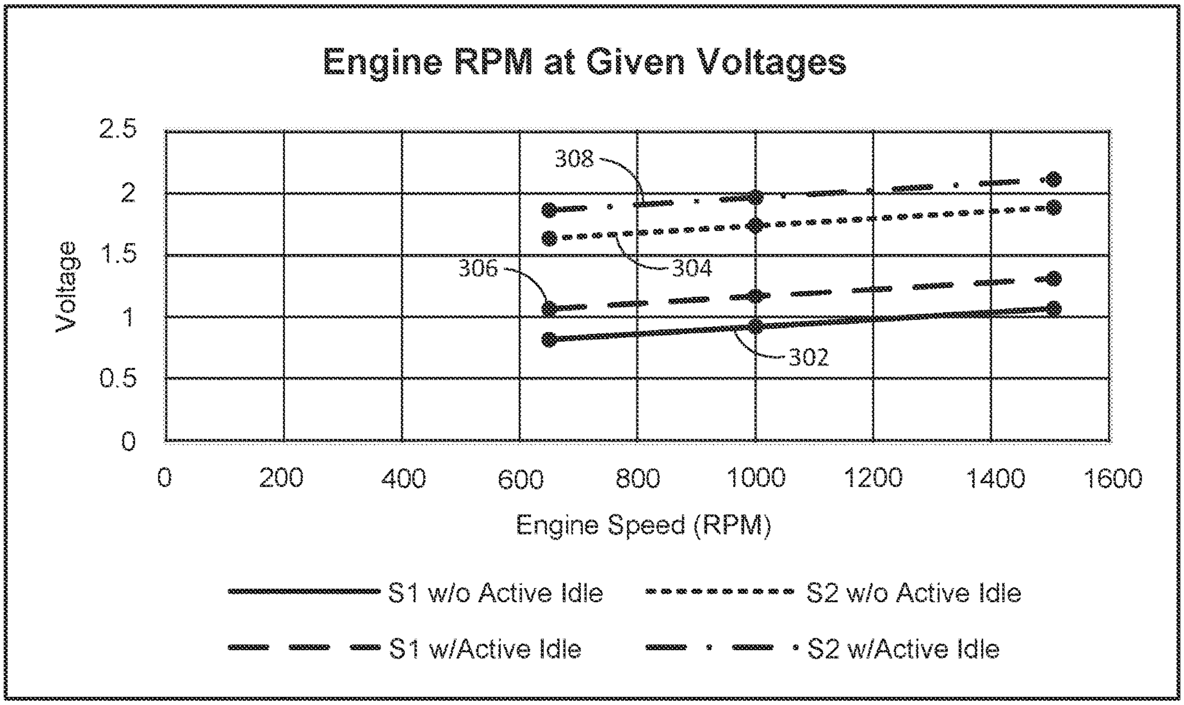
FIG. 3 is a graph displaying the output voltage of a typical accelerator pedal circuit versus the engine speed.

FIG. 3 is a graph displaying the output voltage curve of a typical accelerator pedal circuit versus the engine speed in RPM. Based on the graph of FIG. 3, it can be seen that in this typical example, sensor one (S1) starts at approximately 0.8V (volts) at an engine idle speed of approximately 650 RPM and climbs to approximately 1.05V when reaching the target (for this example) of 1400 RPM. Similarly, redundant sensor two (S2) starts at approximately 1.6V and climbs to approximately 1.8V at 1400 RPM. Therefore, to achieve the desired 1400 RPM at the initial state, i.e., idle, with the active idle control engaged, the input voltage to the ECM requires a voltage target of 1.05V (trace 306) for S1 and 1.8V (trace 308) for S2, thereby emulating the output of the accelerator pedal assembly to achieve the desired 1400 RPM. In other words, although S1 would normally output a value of 0.8V and S2 would output a value of 1.6V at idle, the active idle control module 116 would signal to the ECM that the value for S1 is 1.05V, and the value for S2 is 1.8V, so that the ECM would set the engine speed to the target speed of 1400 RPMs, even though the accelerator pedal is actually fully released.

The active idle control module 116 is configured such that the fully depressed voltage across both sensors does not exceed the OEM maximum voltage threshold for safety and to avoid possible ECM damage from an overvoltage condition on the input.

Figure 4A:
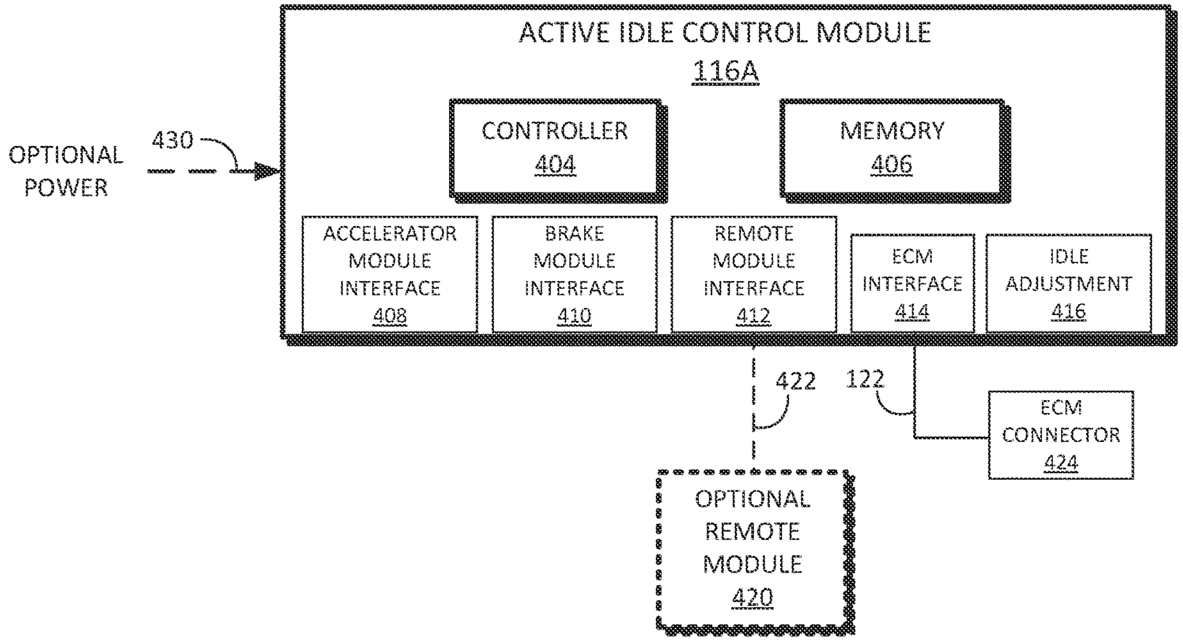
FIG. 4A is an illustrative example block diagram of one embodiment of an active idle control module apparatus consistent with the present disclosure.

FIG. 4A is an illustrative example block diagram of one embodiment of an active idle control module apparatus consistent with the present disclosure. The example of FIG. 4A includes active idle control module 116A, which in this embodiment is the active idle control module 116 of FIG. 1B, incorporating a controller 404 and memory 406. Active idle control module 116A also contains accelerator module interface 408, brake module interface 410, remote module interface 412, and ECM interface 414. ECM interface 414 is communicatively coupled with the vehicle ECM through active engine control output 122 and ECM connector 424. Active engine control output 122 may be, for example, a cable or a vehicle communications bus.

The active idle control module 116A is communicatively coupled into the accelerator pedal assembly, e.g., accelerator pedal assembly 112 from FIG. 1B, via accelerator module interface 408 to intercept the position information of the accelerator pedal. In some embodiments, the active idle control module 116A may draw power from the accelerator pedal assembly. In some other embodiments, the active idle control module 116A may draw power from the vehicle power system via optional power input 430. When the vehicle is stationary, the user can activate the active idle control using, for example, the switch assembly 132 that engages the module. When the switch is not engaged or the vehicle is not stationary, the active idle remains in the off state. In other embodiments, the active idle control module 116A may be enabled using any other appropriate method as would be known to a person of skill in the art.

In some embodiments, the active idle control module 116 includes idle adjustment 416. Idle adjustment 416 is provided to allow an operator to adjust the desired RPM value for the specific vehicle when the active idle control module 116A is in use. In some embodiments, the idle adjustment 416 may allow for adjustment during operation of the vehicle. In some embodiments, the idle adjustment 416 may be a potentiometer mounted on the circuit board of the active idle control module 116A. In other embodiments, the idle adjustment 416 may be any other circuit to allow the user to adjust the target engine speed, as would be known to one skilled in the art. The idle adjustment 416 may be preset for the desired engine speed or may be adjusted by the user at the time of installation or during use.

In some embodiments the active idle control module 116A may be configured to allow initiation of the active idle control mode while the vehicle is in drive. In some embodiments, while in drive the active idle control module 116A may only engage when the brake pedal assembly has been depressed for a continuous period of a predetermined threshold number of seconds. This is considered the activation phase. In these embodiments, the duration of time the brake pedal is depressed will reset if the brake pedal is released at any point during the activation phase and the timer will start at zero when depressed again.

In some other embodiments the active idle control module 116 may be configured to allow initiation of the active idle control mode while the vehicle is moving, but the engine RPM is not directly controlled by the active idle control module 116. Instead, in these embodiments, the active idle control module 116A may be configured to downshift the vehicle to a lower gear selection, since a lower gear will result in increased engine RPM for a given vehicle speed. In these embodiments, the active idle control module 116A will only downshift the vehicle if it determines that the lower gear will result in a number of engine RPMs that is safe for the particular vehicle.

In some embodiments, the active idle control module 116A may also include optional remote module 420, which is communicatively coupled with the remote module interface 412 of the active idle control module 116A via connection 422. In some embodiments, connection 422 may be a cable. In some other embodiments, connection 422 may be a wireless connection, e.g., a Bluetooth wireless interface. Optional remote module 420 may include a switch to allow the user to enable or disable the active idle control module 116A. Optional remote module 420 may also include a display to alert the user to the status of the active idle control module 116A.

Incorporation of remote module 420 may also be used to enable retrofit applications of the active idle control module 116A without requiring modification to the vehicle in which it is installed. In these retrofit applications, the vehicle accelerator pedal assembly is disconnected from the vehicle ECM and connected directly to the active idle control module 116. The active idle control module 116A is then connected to the vehicle ECM in place of the vehicle accelerator pedal assembly. The remote module 420 is then installed in a convenient place in the cabin of the vehicle using, for example, a hook-and-loop fastener, double-faced tape, etc.

Figure 4B:
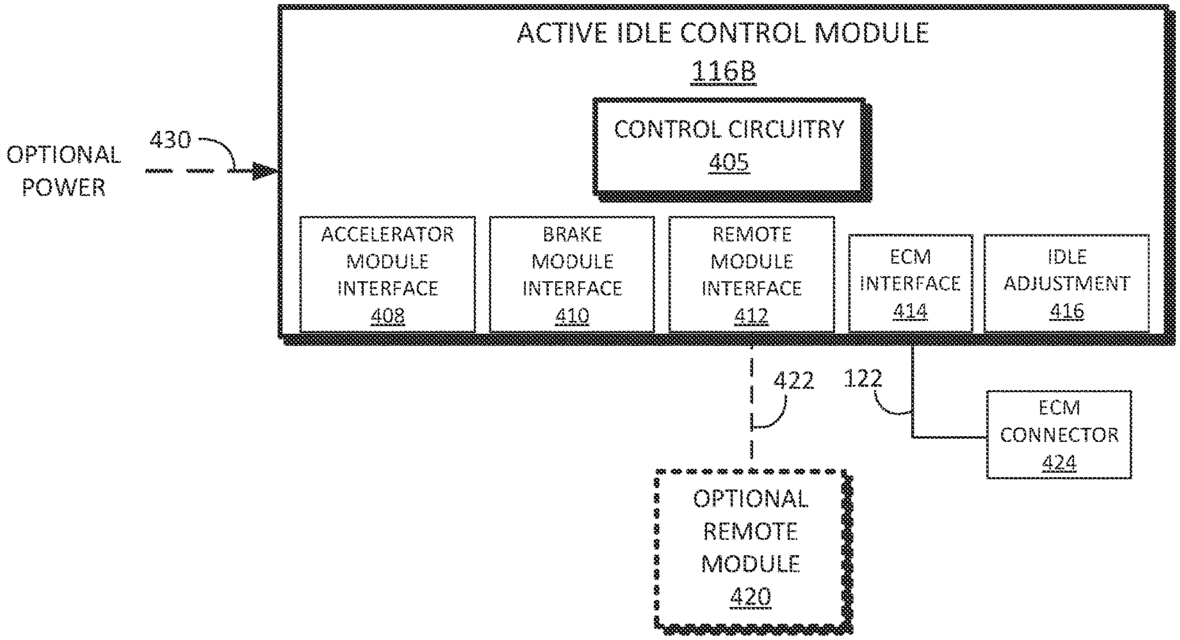
FIG. 4B is an illustrative example block diagram of another embodiment of an active idle control module apparatus consistent with the present disclosure.

FIG. 4B is an illustrative example block diagram of another embodiment of an active idle control module apparatus consistent with the present disclosure. The example of FIG. 4B includes active idle control module 116B, which in this embodiment is the active idle control module 116 of FIG. 1B, incorporating control circuitry 405 in place of controller 404 and memory 406. Active idle control module 116B also contains the accelerator module interface 408, the brake module interface 410, the remote module interface 412, and the ECM interface 414 as in the example of FIG. 4A. The example of FIG. 4B provides the functionality of the example of FIG. 4A, but uses discrete circuitry rather than the controller and memory of FIG. 4A.

In the example of FIG. 4B, the control circuitry 405 may be, for example, a discrete system, e.g., an array of passive components, op-amps, and regulators, that may achieve the same functionality as the controller 404 and the memory 406 of FIG. 4A.

Figure 5:
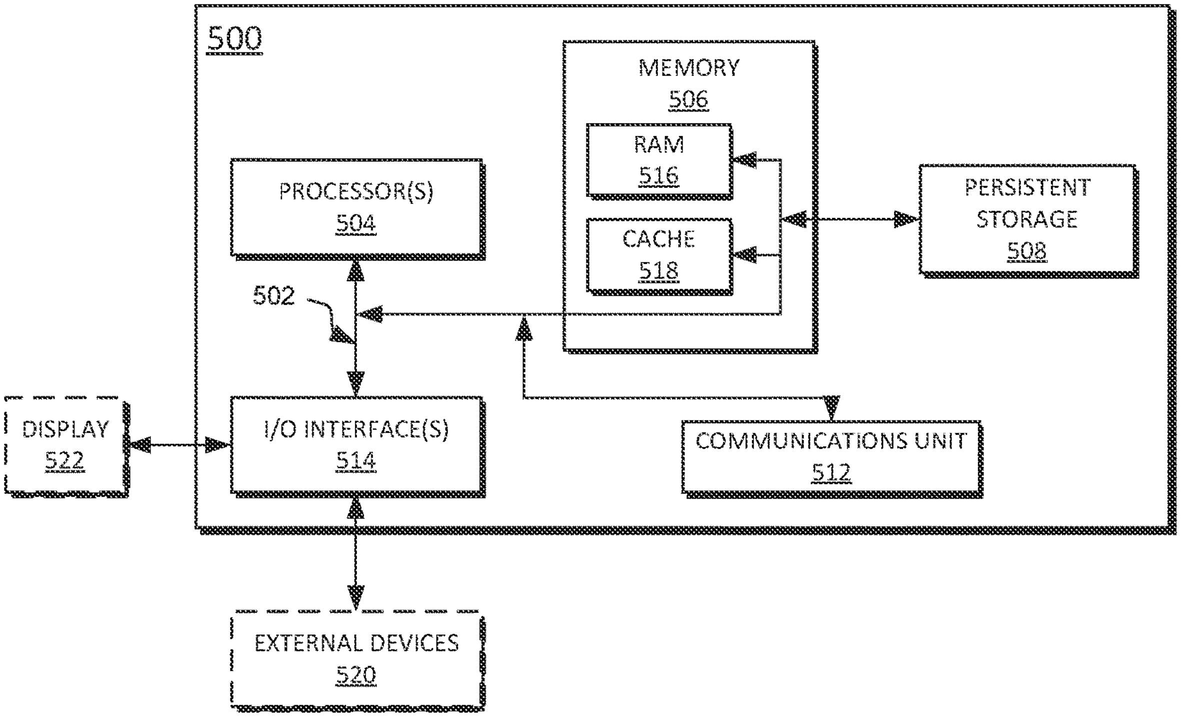
FIG. 5 depicts a block diagram of components of the controller in the active idle control module of FIG. 4A consistent with the present disclosure.

FIG. 5 is a block diagram depicting components of one example 500 of the computing device 102 suitable for the controller for an active idle control module 116 consistent with the present disclosure. FIG. 5 displays the computing device or computer 500, one or more processor(s) 504 (including one or more computer processors), a communications fabric 502, a memory 506 including, a random-access memory (RAM) 516 and a cache 518, a persistent storage 508, which is a non-transitory computer readable storage media, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for the controller for the active idle control module 116 may be stored in the persistent storage 508, or more generally, any computer readable storage media, for execution by one or more of the respective computer processors 504 via one or more memories of the memory 506. The persistent storage 508 may be a semiconductor storage device, flash memory, read only memory (ROM), electronically erasable programmable read-only memory (EEPROM), or any other computer readable storage media that is capable of storing program instruction or digital information.

The communications unit 512, in these examples, provides for communications with other data processing systems or devices. The communications unit 512 may provide communications through the use of either or both physical and wireless communications links.

The I/O interface(s) 514 allows for input and output of data with other devices that may be connected to computer 500. For example, the I/O interface(s) 514 may provide a connection to external device(s) 520 such as a keyboard, a keypad, a touch screen, and/or some other suitable input device. External device(s) 520 can also include portable computer readable storage media such as, for example, thumb drives, portable optical or magnetic disks, and memory cards. Software and data used to practice embodiments of the present disclosure, e.g., the controller for the active idle control module 116, can be stored on such portable computer readable storage media and can be loaded onto persistent storage 508 via the I/O interface(s) 514. I/O interface(s) 514 also connect to a display 522.

Optional display 522 provides a mechanism to display data to a user and may be, for example, a computer monitor. Display 522 can also function as a touchscreen, such as a display of a tablet computer. Display 522 may be used, for example, during a firmware upgrade to the active idle control module 116, or during troubleshooting and/or maintenance of the module.

According to one aspect of the disclosure, there is thus provided an apparatus for active engine idle control for a vehicle comprising: an accelerator module interface; an engine control module (ECM) interface; a computer readable storage media; and a controller. The controller is configured to: determine an engine speed target for a vehicle engine in revolutions per minute (RPM) based on an electrical load on the vehicle, wherein the engine speed target is a minimum engine RPM at which a generator output meets or exceeds an electrical demand of the vehicle; determine a voltage curve for one or more position sensors of an accelerator module in the vehicle; determine a voltage target for the ECM for each position sensor of the one or more position sensors, wherein the voltage target for the ECM is a voltage that causes the ECM to set an engine RPM at the engine speed target based on the voltage curve; and responsive to a first signal that the apparatus is engaged and a second signal that the vehicle is stopped, set an input voltage to the ECM at the voltage target for each of the one or more position sensors.

According to another aspect of the disclosure, there is thus provided an apparatus for active engine idle control for a vehicle comprising: an engine control module coupled to an engine of the vehicle; an accelerator pedal assembly configured to provide one or more position sensor outputs representative of a force applied to an accelerator pedal of the vehicle; and an active idle control module coupled to the engine control module and the accelerator pedal assembly, the active idle control module configured for providing an engine control output in response to the one or more position sensor outputs, the engine control module being responsive to the engine control output to operate the engine of the vehicle at a target RPM.

According to yet another aspect of the disclosure, there is thus provided an apparatus for active engine idle control for a vehicle comprising: an accelerator module interface; an engine control module (ECM) interface; an idle adjustment; a computer readable storage media; and a controller. The controller is configured to: determine an engine speed target for a vehicle engine in revolutions per minute (RPM) based on the idle adjustment; determine a voltage curve for one or more position sensors of the accelerator module interface; determine a voltage target for the ECM for each position sensor of the one or more position sensors, wherein the voltage target for the ECM is a voltage that causes the ECM to set an engine RPM at the engine speed target based on the voltage curve; and responsive to a first signal that the apparatus is engaged and a second signal that the vehicle is stopped, set an input voltage to the ECM at the voltage target for each of the one or more position sensors.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable storage medium having instructions stored thereon that when executed by one or more processors perform the methods. Thus, for example, memory 406 may store instructions (in, for example, firmware or software) to perform the operations described herein. The storage medium, e.g. the memory 406, may include any type of tangible medium, for example, any type of disk optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. An apparatus for active engine idle control for a vehicle, the apparatus comprising:
- an accelerator module interface;
- an engine control module (ECM) interface;
- a computer readable storage media; and
- a controller, the controller configured to:
  - determine an engine speed target for a vehicle engine in revolutions per minute (RPM) based on an electrical load on the vehicle, wherein the engine speed target is a minimum engine RPM at which a generator output meets or exceeds an electrical demand of the vehicle;
  - determine a voltage curve for one or more position sensors of an accelerator module in the vehicle;
  - determine a voltage target for the ECM for each position sensor of the one or more position sensors, wherein the voltage target for the ECM is a voltage that causes the ECM to set an engine RPM at the engine speed target based on the voltage curve; and
  - responsive to a first signal that the apparatus is engaged and a second signal that the vehicle is stopped, set an input voltage to the ECM at the voltage target for each of the one or more position sensors.

2. The apparatus of claim 1, further comprising an optional remote module; wherein the optional remote module is communicatively coupled to the apparatus.

3. The apparatus of claim 2, wherein the optional remote module further comprises:
- a switch, wherein the switch is configured to engage the active engine idle control when selected; and
- a display of a status of the active engine idle control.

4. The apparatus of claim 3, wherein the optional remote module is communicatively coupled to the apparatus via a cable.

5. The apparatus of claim 3, wherein the optional remote module is communicatively coupled to the apparatus via a wireless interface.

6. The apparatus of claim 5, wherein the wireless interface is a Bluetooth wireless interface.

7. The apparatus of claim 1, wherein the apparatus is configured to enable retrofit applications.

8. The apparatus of claim 1, wherein responsive to the first signal that the apparatus is engaged and the second signal that the vehicle is stopped, set the input voltage to the ECM at the voltage target for each of the one or more position sensors comprises:
- responsive to the first signal that the apparatus is engaged and the second signal that the vehicle is moving, downshift the vehicle to a lower gear selection to set an engine speed at the engine speed target.

9. An apparatus for active engine idle control for a vehicle, the apparatus comprising:
- an accelerator module interface;
- an engine control module (ECM) interface;
- an idle adjustment;
- a computer readable storage media; and a controller, the controller configured to:
determine an engine speed target for a vehicle engine in revolutions per minute (RPM) based on the idle adjustment;
determine a voltage curve for one or more position sensors of the accelerator module interface;
determine a voltage target for the ECM for each position sensor of the one or more position sensors, wherein the voltage target for the ECM is a voltage that causes the ECM to set an engine RPM at the engine speed target based on the voltage curve; and
responsive to a first signal that the apparatus is engaged and a second signal that the vehicle is stopped, set an input voltage to the ECM at the voltage target for each of the one or more position sensors.

10. The apparatus of claim 9, further comprising an optional remote module; wherein the optional remote module is communicatively coupled to the apparatus.

11. The apparatus of claim 10, wherein the optional remote module further comprises:
a switch, wherein the switch is configured to engage the active engine idle control when selected; and
a display of a status of the active engine idle control.

12. The apparatus of claim 9, wherein the idle adjustment is preset by a user.

13. The apparatus of claim 9, wherein the idle adjustment is accessible to a user to allow adjustment during operation.

14. The apparatus of claim 9, wherein responsive to the first signal that the apparatus is engaged and the second signal that the vehicle is stopped, set the input voltage to the ECM at the voltage target for each of the one or more position sensors comprises:
responsive to the first signal that the apparatus is engaged and the second signal that the vehicle is moving, downshift the vehicle to a lower gear selection to set an engine speed at the engine speed target.

* * * * *